No. 748,825. PATENTED JAN. 5, 1904.
S. J. WEBB.
ROLLER BEARING.
APPLICATION FILED APR. 11, 1901.
NO MODEL. 2 SHEETS—SHEET 1.

No. 748,825. PATENTED JAN. 5, 1904.
S. J. WEBB.
ROLLER BEARING.
APPLICATION FILED APR. 11, 1901.
NO MODEL. 2 SHEETS—SHEET 2.
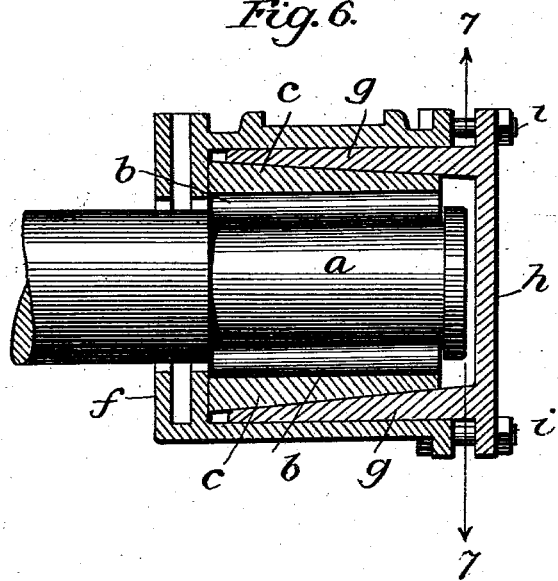
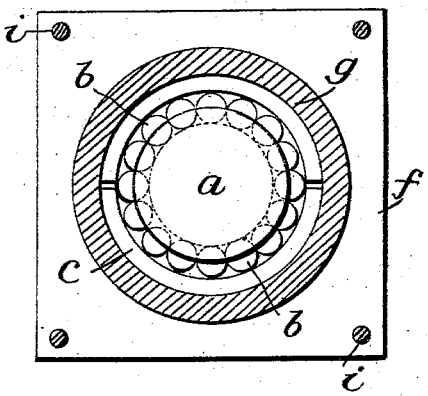
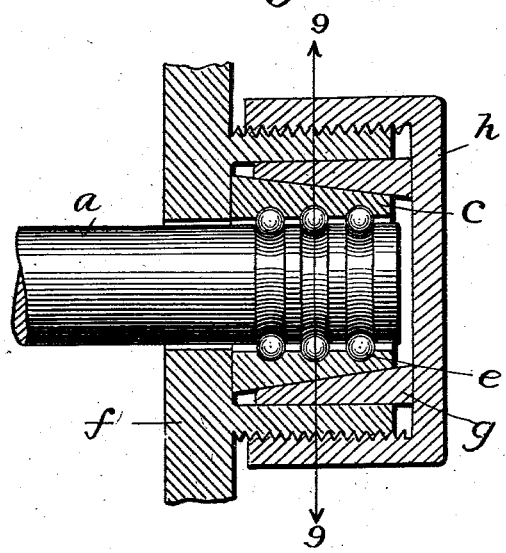
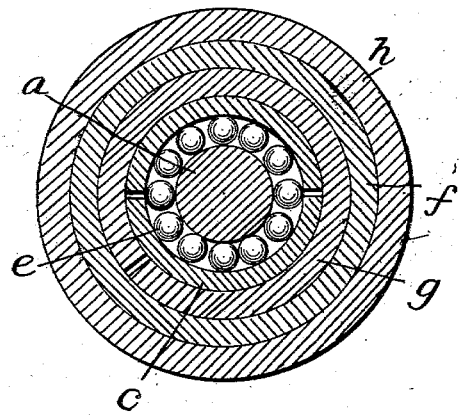

No. 748,825. Patented January 5, 1904.

UNITED STATES PATENT OFFICE.

SAMUEL J. WEBB, OF MINDEN, LOUISIANA.

ROLLER-BEARING.

SPECIFICATION forming part of Letters Patent No. 748,825, dated January 5, 1904.

Application filed April 11, 1901. Serial No. 55,410. (No model.)

*To all whom it may concern:*

Be it known that I, SAMUEL J. WEBB, a citizen of the United States, residing at Minden, in the parish of Webster and State of Louisiana, have invented certain new and useful Improvements in Roller-Bearings, of which the following is a specification.

My invention relates to antifriction-bearings; and it consists of means whereby to secure a close contact and take up wear between the rollers of roller-bearings and the surfaces upon which they travel, as fully set forth hereinafter and as illustrated in the accompanying drawings, in which—

Figure 1:
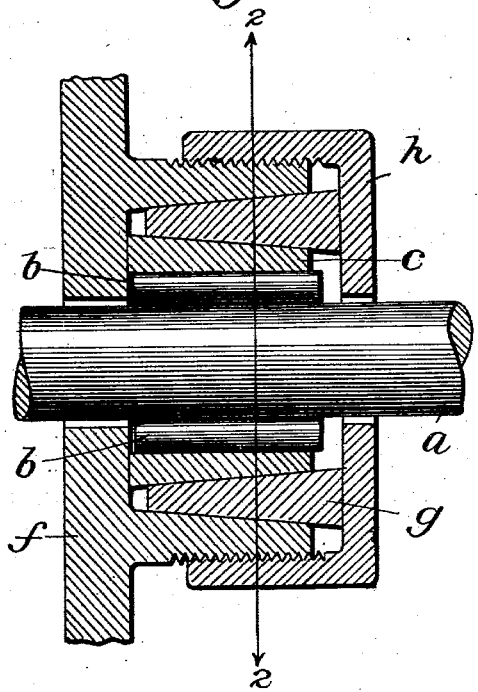
Figure 2:
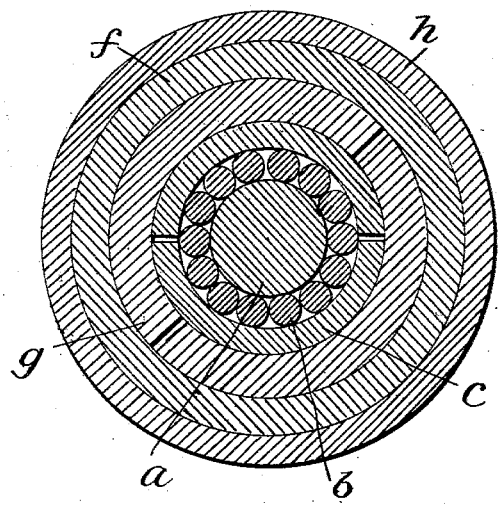
Figure 3:
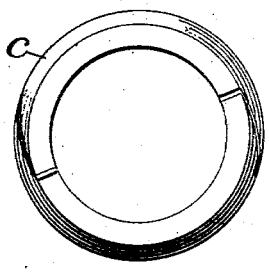
Figure 4:
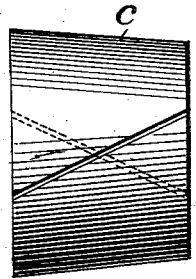
Figure 5:
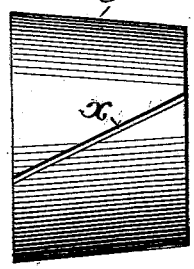

Figure 1 is a transverse section of a bearing-box, showing a shaft, cylindrical bearings, and bearing-sleeve embodying my invention. Fig. 2 is a section on the line 2 2, Fig. 1; Fig. 3, an end view of the sectional bearing-sleeve in sections; Fig. 4, a side view of the sleeve shown in Fig. 3; Fig. 5, a side view of a split sleeve; Fig. 6, a section showing my improvement with modified means for contracting the sleeve applied to a car-axle box; Fig. 7, a sectional view of the box on the line 7 7, Fig. 6; Fig. 8, a section of a roller-bearing in which antifriction-balls are used embodying my improvement; Fig. 9, a section on the line 9 9, Fig. 8.

The shaft or axle *a* extends into or through the box or bearing *f*, the character of the latter depending on the character of the structure upon which the roller-bearing is to be employed, the shaft taking its bearing upon a series of cylinders *b* or spheres *e*, which I designate generally under the term "rolls," the structures adapted to the use of cylinders being shown in Figs. 1 and 7, and that to balls or spheres shown in Fig. 8.

Encircling the bearing-rolls is a sleeve *c*, the inner face of which is adapted to said rolls, whether cylinders or balls, and preferably the outer face is conical or tapering. This sleeve-bearing is constructed so as to be contractible either in a single piece with a diagonal slot *x*, as shown in Fig. 5, or in two sections with inclined abutting edges, as shown in Figs. 3 and 4, so that when the said sleeve encircles and incloses the rolls its inner face may be brought to bear closely thereon by contracting the said sleeve, thus bringing the opposite ends closer together. By having the said edges diagonal or inclined to the axis of the shaft there will be no jar or hammering as the rolls pass across the line or lines of division, as will be the case if the latter were parallel to the axis of the shaft.

Any suitable means may be employed for contracting the bearing-sleeve until it takes its bearing upon the roll. When the said sleeve has a conical exterior, it may be contracted by means of a collar *g*, forced between said exterior and the inner face of the box, which is adapted to the outer face of the collar, which may be cylindrical, as in Fig. 6, or conical, as in Fig. 1.

If desired, the collar *g* may form part of the cap-plate *h* of the box *f*, as shown in Fig. 6, in which case the said cap-plate may be drawn inward by means of bolts *i*, or the collar may be separate from the cap-plate and may be forced inward by form-threads upon the flange of the cap-plate adapted to those upon the outside of the box, as shown in Fig. 1. In this case the collar *g* may be contractible, being either slit like the sleeve *c* or in sections, as indicated in Figs. 2 and 9, it being in sections in Fig. 2 and slit in Fig. 9.

Without limiting myself to the precise construction and arrangement of parts shown, I claim—

1. In a roller-bearing the combination of the axle or shaft, a bearing-box, series of rolls around the shaft, a contractible bearing-sleeve tapering throughout its length and surrounding the rollers, an annular collar also tapering throughout its length, for contracting the sleeve upon the rollers, and means for forcing the collar between the sleeve and a bearing in the box, substantially as set forth.

2. In a roller-bearing the combination of the axle or shaft, a bearing-box, series of rolls around the shaft and a contractible tapering bearing-sleeve surrounding the rollers and an annular tapering collar for contracting the sleeve upon the rollers, and a cap bearing on said collar and means for carrying the cap toward the box to force inward the collar, substantially as set forth.

3. The combination of a bearing-box, a shaft extending through the same, antifriction-rolls arranged about the shaft, a contractible bearing-sleeve tapering in one direction throughout its length inclosing the rollers, and a tapering contractible collar and
5 means for forcing it inward between the sleeve and the box, substantially as set forth.

In testimony whereof I have signed my name to this specification in the presence of two subscribing witnesses.

SAMUEL J. WEBB.

Witnesses:
H. M. GILLMAN, Jr.,
W. CLARENCE DUVALL.